(12) United States Patent
Sakaniwa et al.

(10) Patent No.: US 7,539,698 B2
(45) Date of Patent: May 26, 2009

(54) FILE NAME GENERATING UNIT

(75) Inventors: Katsuyuki Sakaniwa, Takarazuka (JP);
Toshihiro Tanaka, Nishinomiya (JP);
Hiroshi Saitoh, Sakai (JP); Hideki Ootaka, Hirakata (JP); Norikatsu Yoshida, Osaka (JP); Hisataka Ueda, Kadoma (JP); Nobukatsu Okuda, Neyagawa (JP)

(73) Assignee: Panasonic Corporation, Osaka (JP)

( * ) Notice: Subject to any disclaimer, the term of this patent is extended or adjusted under 35 U.S.C. 154(b) by 235 days.

(21) Appl. No.: 10/586,497

(22) PCT Filed: Mar. 2, 2005

(86) PCT No.: PCT/JP2005/003466

§ 371 (c)(1),
(2), (4) Date: Jul. 20, 2006

(87) PCT Pub. No.: WO2005/098627

PCT Pub. Date: Oct. 20, 2005

(65) Prior Publication Data

US 2007/0027892 A1 Feb. 1, 2007

(51) Int. Cl.
*G06F 17/00* (2006.01)
(52) U.S. Cl. .................................................. 707/102
(58) Field of Classification Search .................. 707/101, 707/102, 103 R
See application file for complete search history.

(56) References Cited

U.S. PATENT DOCUMENTS

| | | | |
|---|---|---|---|
| 6,385,728 B1 | 5/2002 | DeBry | |
| 6,463,155 B1 | 10/2002 | Akiyama et al. | |
| 6,650,752 B2 | 11/2003 | Akiyama et al. | |
| 6,650,754 B2 | 11/2003 | Akiyama et al. | |
| 2003/0002679 A1 | 1/2003 | Akiyama et al. | |
| 2003/0002680 A1 | 1/2003 | Akiyama et al. | |
| 2005/0169605 A1 | 8/2005 | Hung | |
| 2005/0243190 A1* | 11/2005 | Ogikubo | 348/231.99 |
| 2006/0168318 A1* | 7/2006 | Twiss | 709/238 |

FOREIGN PATENT DOCUMENTS

| | | |
|---|---|---|
| CN | 1221917 | 7/1999 |
| JP | 7-73205 | 3/1995 |
| JP | 10-177646 | 6/1998 |
| JP | 11-110531 | 4/1999 |

(Continued)

OTHER PUBLICATIONS

Standard ECMA-107, "*Volume and File Structure of Disk Cartridges for Information Interchange*", 2nd Edition, Jun. 1995, pp. i-40.

(Continued)

*Primary Examiner*—Sana Al-Hashemi
(74) *Attorney, Agent, or Firm*—Wenderoth, Lind & Ponack, L.L.P.

(57) ABSTRACT

An object of the present invention is to reduce a possibility of existence of a plurality of identical file names in files which are created by a plurality of apparatuses. This is accomplished using a file name generation apparatus having an UMID generation unit (12) generating a globally unique identifier, and a file name generation unit (14) generating a file name including the globally unique identifier generated by the UMID generation unit (12).

10 Claims, 18 Drawing Sheets

```
060A2B340101010501010D4313000000 BEF8467C533005CC0040001004200024
```
(S101) Extracts Material No. ↓

| BE | F8 | 46 | 7C | 53 | 30 | 05 | CC | 00 | 40 | 00 | 10 | 04 | 20 | 00 | 24 |

(S102) Divide Material No. into 8 Blocks ↓

| BE | F8 | | 46 | 7C | | 53 | 30 | | 05 | CC | | 00 | 40 | | 00 | 10 | | 04 | 20 | | 00 | 24 |

(S103) Extract 16 bits Numerals ↓

| 0xF8BE | | 0x7C46 | | 0x3053 | | 0xCC05 | | 0x4000 | | 0x1000 | | 0x2004 | | 0x2400 |

(S104) Exclusive OR of Every Bits ↓

| 0x2CAA |

(S105) Reminder of Division of Exclusive OR by 1291 ↓

| 1106 |

(S106) Base 36 Notation ↓

| UQ |

FOREIGN PATENT DOCUMENTS

| | | |
|---|---|---|
| JP | 11-164234 | 6/1999 |
| JP | 11-243536 | 9/1999 |
| JP | 2000-187607 | 7/2000 |
| JP | 2000-242534 | 9/2000 |
| JP | 2001-16537 | 1/2001 |
| JP | 2001-61088 | 3/2001 |
| JP | 2001-109651 | 4/2001 |
| JP | 2002-73391 | 3/2002 |
| JP | 2002-297628 | 10/2002 |
| JP | 2003-319330 | 11/2003 |
| JP | 2004-56707 | 2/2004 |
| JP | 2004-96582 | 3/2004 |

OTHER PUBLICATIONS

Chinese Office Action issued Sep. 7, 2007 in Chinese Patent Application No. 200580003230.2.

* cited by examiner 650    671    652 653
XXXX_YYYYYYYYY_Z.EXT

```
     660  661 662 663
     ⌢    ⌢   ⌢  ⌢
    XXXXYYZZ.EXT
```

FIG. 17

060A2B3401010501010D4313000000 BEF8467C533005CC004000100420000024

↓ (S101) Extracts Material No.

| BE | F8 | 46 | 7C | 53 | 30 | 05 | CC | 00 | 40 | 00 | 10 | 04 | 20 | 00 | 24 |

↓ (S102) Divide Material No. into 8 Blocks

| BE F8 | 46 7C | 53 30 | 05 CC | 00 40 | 00 10 | 04 20 | 00 24 |

↓ (S103) Extract 16 bits Numerals

| 0xF8BE | 0x7C46 | 0x3053 | 0xCC05 | 0x4000 | 0x1000 | 0x2004 | 0x2400 |

↓ (S104) Exclusive OR of Every Bits

0x2CAA

↓ (S105) Reminder of Division of Exclusive OR by 1291

1106

↓ (S106) Base 36 Notation

UQ

| UMID | Image-Capturing Location |
|---|---|
| UMID-1 | Tokyo |
| UMID-2 | Osaka |
| UMID-3 | Tokyo |

T

FILE NAME GENERATING UNIT

BACKGROUND OF THE INVENTION

1. Field of the Invention

The present invention relates to apparatus for generating a file name, and more especially to a technology for generating a file name in an image capturing apparatus, such as a video camera or a digital still camera.

2. Description of the Related Art

In an image capturing apparatus, such as a video camera or a is digital still camera, data can be stored in a random access storage medium, such as a memory card, a hard disk, or an optical disk. When the data is stored in such a storage medium, it is common to store the data as a file for the purpose of user convenience.

Here, a module called a file system is used to manage the file in the storage medium. A common file system is the File Allocation Table (FAT) (non-patent document 1: Standard ECMA-107, "Volume and File Structure of Disk Cartridges for Information Interchange"). Since it is complicated to operate the file system, usually an operating system (OS) is equipped in the image capturing apparatus to implement the file system as software.

Here, when the file is stored in the storage medium equipped in the image capturing apparatus, in order to avoid bothering a user with file name designation, it is common that a program equipped in the image capturing apparatus automatically generates a file name, such as a serial number. However, this method for automatically generating a file name has a problem that, when a file in the storage medium is copied onto a personal computer (PC), the PC already has the same file name whose file has been previously copied from the storage medium. In this case, there is a risk that the new file is written over the existing file and eventually the existing file is deleted. As a result, various methods for generating a file name have been suggested to prevent the above-mentioned risk of deletion.

For example, a patent document 1 (Japanese Patent Laid-Open No. 11-164234 publication) discloses a method for generating a directory with a name including an image-capturing time. Further, a patent document 2 (Japanese Patent Laid-Open No. 2001-109651 publication) discloses a method for generating a file name which is not identical with any other file name and is easily arranged in order of an image-capturing date (year, month, and date). Still further, a patent document 3 (Japanese Patent Laid-Open No. 10-177646 publication) discloses a method by which a file name is not identical with any other file name as far as the file is created by the same image capturing apparatus. This means that, in the methods disclosed in patent documents 1 to 3, the image-capturing time is included in the file name in order to solve the problem of overwriting and deleting the existing file.

BRIEF SUMMARY OF THE INVENTION

For news reports by a broadcast station, however, it is common that a plurality of users take videos or photographs by using a plurality of image capturing apparatuses at the same time. Thereby, there is a case that files created by the above image capturing are gathered in a single PC or storage medium to edit the files.

In this case, there is a high risk of existence of a plurality of identical file names in the same apparatus, when the file names include only their image-capturing times. In a case that there are a plurality of identical file names, it is necessary to change one of the identical file names in order to prevent from overwriting and deleting the existing file.

In order to solve the above problems, it is an object of the present invention to reduce a possibility of existence of a plurality of identical file names in files which are created by a plurality of apparatuses.

In order to achieve the above object, according to the present invention, a file name generation apparatus which generates a file name, the apparatus includes: an identifier generation unit operable to generate a globally unique identifier; and a file name generation unit operable to generate a file name which includes the globally unique identifier generated by the identifier generation unit. Thereby, it is possible to prevent the existence of a plurality of identical file names in the files which are created by a plurality of the image capturing apparatuses.

Here, the globally unique identifier includes: information for identifying a chronological order in which a file is created; and information for identifying a hardware which creates the file. By including, in the file names, information for identifying an order in which the files have been created, it is possible to prevent the existence of a plurality of identical file names which are generated by a single apparatus. Further, by including, in the file names, information for identifying hardware apparatuses which have created the files, it is possible to prevent the existence of a plurality of identical file names which are generated by a plurality of apparatuses.

More specifically, the globally unique identifier includes: one of a date and a time when the file is created, and a serial number representing a chronological order in which the file is created; and one of a serial number of the file name generation apparatus, and a serial number of a storage medium in which the file is stored. In other words, the "data for identifying a order by which the files are created" means a date and a time of the file creation or a serial number which indicates a order by which the files are created. On the other hand, The "data for identifying a hardware which creates the fie" means a serial number of the file name generation apparatus, or a serial number of the storage medium in which the created file is stored.

Thus, it is possible to generate a globally unique identifier only by combining the serial number of the file generation and the serial number of the storage medium.

Here, the calculation unit may calculate a hash value from the globally unique identifier generated by the identifier generation unit, and the file name generation may generate a file name which includes the hash value calculated by the calculation unit. Thereby, is the globally unique identifier is converted into a character string with a predetermined length, so that it is possible to shorten the file name.

Furthermore, the hash value may be represented by an alpha-numeric character in base-N notation, where N is larger than 10. Thereby, it is possible to indicate more values by using a limited number of characters.

Still further, the file name which includes the hash value may be represented by a main file name of eight or less characters and an extension of three or less characters. Thereby, it is possible to implement the present invention even in a file system which supports only a short file name, a so-called 8.3 format.

Still further, the storage unit may store multimedia data into a storage medium, under the file name which is generated by the file name generation unit. Thereby, it is possible to store, into the storage medium such as a memory card, multimedia data which is created by the image capturing apparatus such as a video camera.

Note that the present invention can be implemented not only as the above-described file name generation apparatus, but also as a file name generation method which includes characteristic processing performed by the file name generation apparatus, and as a program which causes a computer to perform the processing. Here, it is obvious that such a program can be distributed via a storage medium such as a CD-ROM, or a transmission medium such as the Internet.

Accordingly, the file name generation apparatus according to the present invention enables to generate a file name which includes a globally unique identifier, so that it is possible to prevent existence of a plurality of identical file names in files which are created by a plurality of apparatuses.

BRIEF DESCRIPTION OF THE DRAWINGS

FIG. 17 is a diagram showing processing for generating a hash value.

DETAILED DESCRIPTION OF THE INVENTION

The following describes the embodiments according to the prevent invention with reference to the drawings.

First Embodiment

Figure 1:
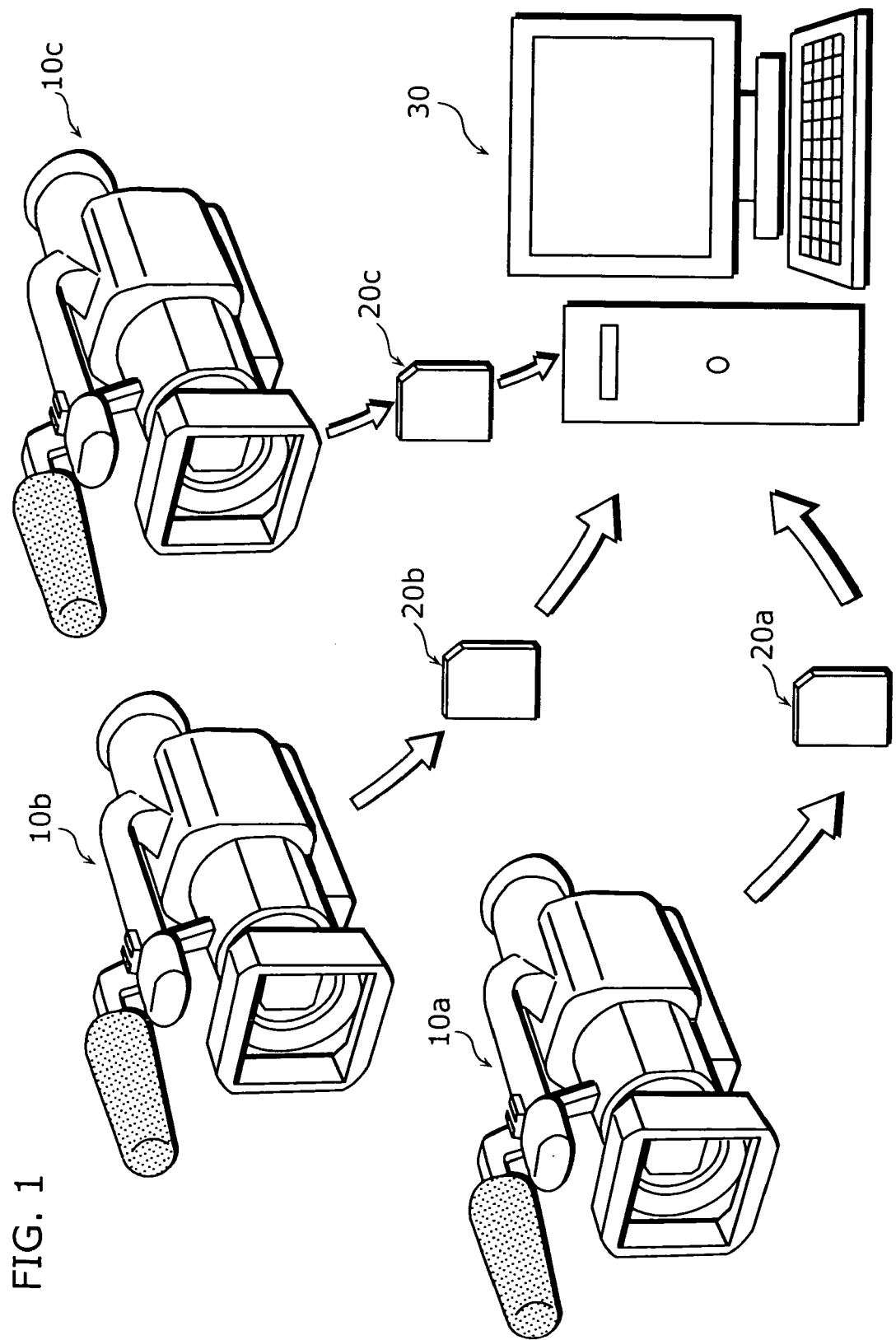
FIG. 1 is a schematic diagram showing an overall editing system to which the present invention is applied.

FIG. 1 is a schematic diagram showing an overall editing system to which the present invention is applied. Here, it is assumed that multimedia data (hereafter, referred to as simply "data"), such as video data and audio data, which are created by three image capturing apparatuses 10a, 10b, and 10c are edited in a single editing apparatus 30. The image capturing apparatuses 10a, 10b, and 10c transmit the data to the editing apparatus 30 by using storage media 20a, 20b, and 20c, respectively.

The image capturing apparatuses 10a, 10b, and 10c (hereafter, referred to as "image capturing apparatus 10" when they are not distinguished) are video cameras, digital still cameras, or the like, which create multimedia data, such as video data and audio data. The storage media 20a, 20b, and 20c (hereafter, referred to as "storage medium 20" when they are not distinguished) are memory cards, hard disks, optical disks, or the like, which pass, to the editing apparatus 30, the data created by the image capturing apparatus 10. The editing apparatus 30 is a PC or the like, which is equipped with software for editing the data stored in the storage medium 20.

Figure 2:
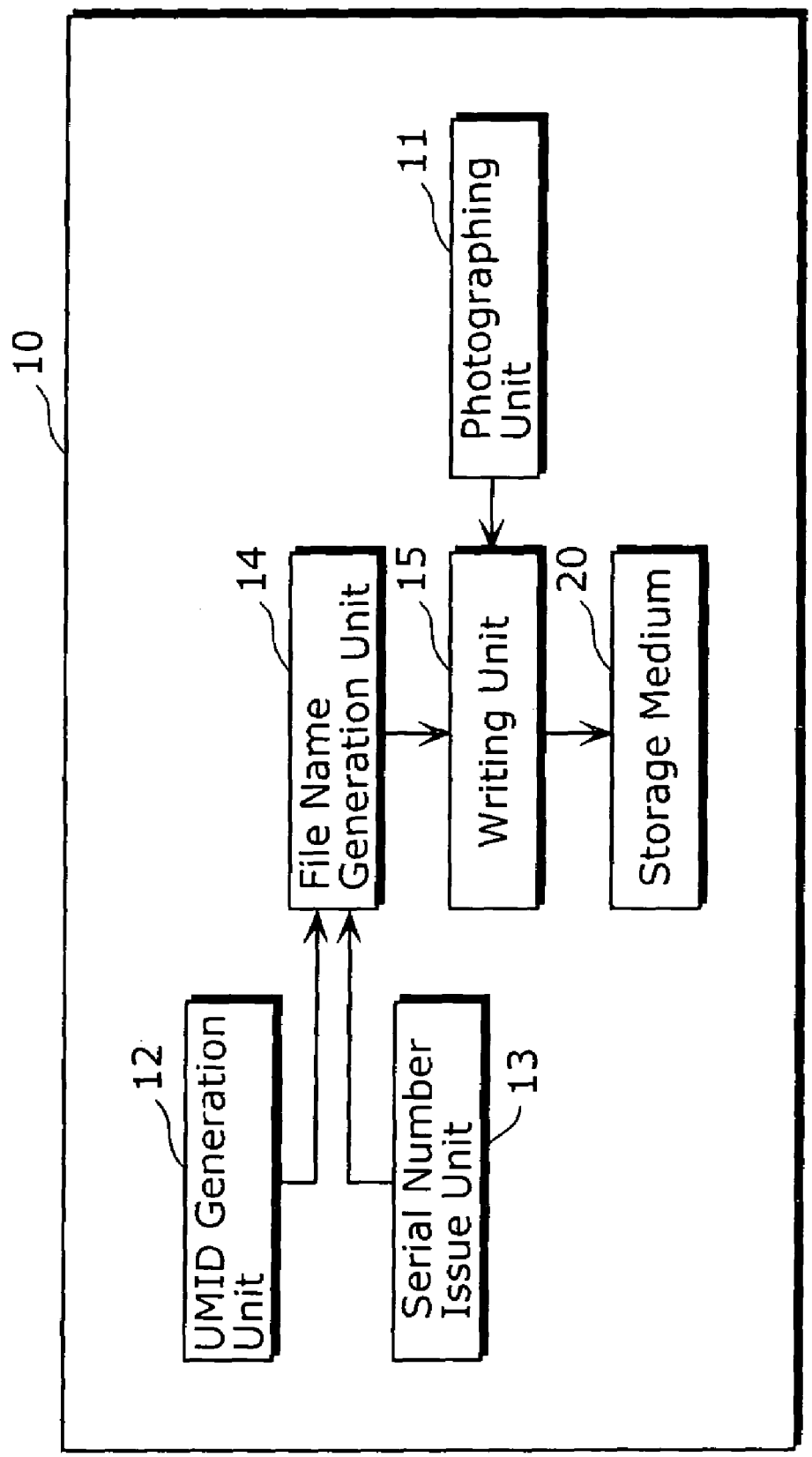
FIG. 2 is a schematic functional block diagram of an image capturing apparatus according to the first embodiment.

FIG. 2 is a schematic functional block diagram of the image capturing apparatus 10 according to the first embodiment. As shown in FIG. 2, the image capturing apparatus 10 includes as functions: an image capturing (photographing) unit 11; a unique material identifier (UMID) generation unit 12; a serial number issue unit 13; a file name generation unit 14; and a writing unit 15. The image capturing unit 11 includes a camera unit for creating video data, a microphone for creating audio data, and the like. The UMID generation unit 12 generates a below-described UMID after the image capturing unit 11 generates the data. The serial number issue unit 13 issues a serial number, such as "0001", after the image capturing unit 11 generates the data. The file name generation unit 14 generates a file name which includes the UMID generated by the UMID generation unit 12 and the serial number issued by the serial number issue unit 13. The writing unit 15 writes, into the storage medium 20, the data which is created by the image capturing apparatus 11, under the file name which is generated by the file name generation unit 14. Obviously, the image capturing apparatus 10 further includes an operation unit for operating the apparatus, a reproduction unit for reproducing the data stored in the storage medium 20, and the like, but these units are not shown in the figure, since they are not principal features of the present invention.

Figure 3:
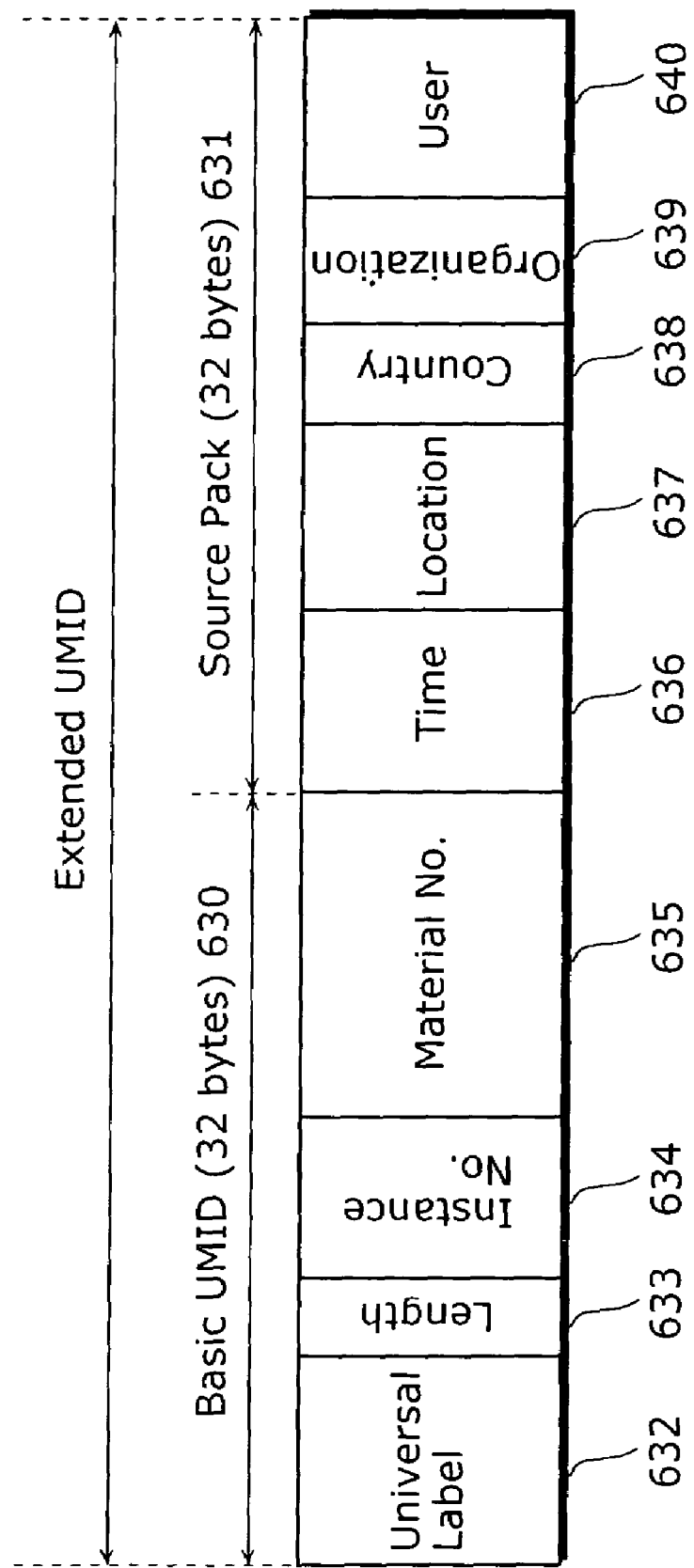
FIG. 3 is a diagram showing a data format of an extended UMID.

FIG. 3 is a diagram showing a data format of an extended UMID which is defined by the SMPTE330M. The UMID is a globally unique identifier (one and only identifier in the world) for identifying a material, such as video and audio, before the material is edited, and the UMID includes: a 32-byte basis UMID 630 and a 32-byte source pack 631, as shown in FIG. 3.

The basic UMID 630 includes: a 12-byte universal label 632; a 1-byte length 633; a 3-byte instance number 634; and a 16-byte material number 635. In the universal label 632, a byte sequence from the first byte to the tenth byte is fixed, and the eleventh and the twelfth byte represent information which indicates whether the data is video data or audio data, and information which indicates material number generation method, respectively. The length 633 is a length of the byte sequence from the instance number 634. The instance number 634 indicates whether the data is original data or copied data.

The material number 635 is the number which is not zero and generated by one of techniques defined in standard regulation, and the material number 635 includes, for example, a 7-byte date and time; a 1-byte time zone (or random number);

and a 8-byte machine node (SMTPTE330M Annex AA.4, IEEE1394 network method). The 7-byte date and time includes the first 4-byte time and the last 3-byte date. As the machine node, EUI-64 Network Node ID which is defined by the IEEE1394 is used. Alternatively, the material number 635 includes a 8-byte time snap, a 2-byte random number, and a 6-byte machine node (SMTPTE330M AnnexAA.1, SMPTE method). The time snap is values which indicate a frame, a second, a minute, and a time, each of which is obtained from, for example, clock information generated by a time code generator in the apparatus. The random number is obtained from, for example, a M-sequence generator which is automatically executed by software. The machine node includes the first 3-byte value which is assigned to a organization name, and the last 3-byte value which is an unique serial number which is assigned to the applied apparatus.

The source pack 631 represents meta data and includes a 8-byte time 636, a 12-byte location 637, a 4-byte country 638, a 4-byte organization 639, and 4-byte user 640. Those information can be obtained by using the global positioning system (GPS).

Here, the image capturing apparatus 10 is assumed to store the vide data and the audio data separately in different files in the storage medium 20, in consideration of affinity with the editing. This means that a plurality of files are created when a video or a photograph is taken. A combination of the video data and the audio data, which are created at the same time, is referred to as a clip. The clip may include thumbnail, meta data, and the like, in addition to the video data and the audio data. Furthermore, the file of video data and the file of audio data file, which are components in the clip, are referred to as essence files.

Figure 4:
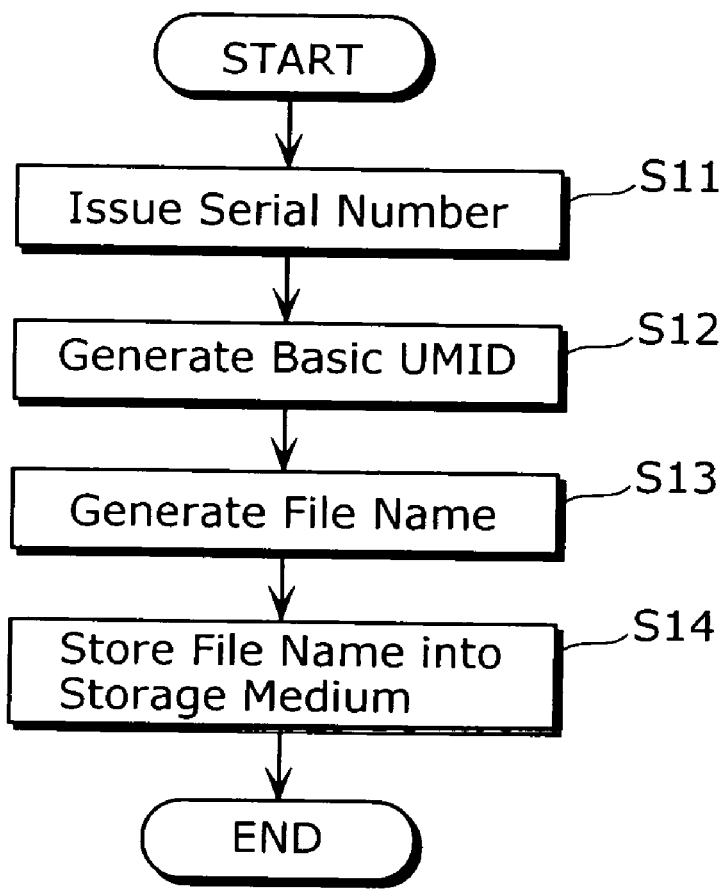
FIG. 4 is a flowchart showing processing performed by the image capturing apparatus according to the first embodiment.

FIG. 4 is a flowchart showing processing performed by the image capturing apparatus 10 according to the first embodiment. The following describes the processing performed by the image capturing apparatus 10 according to the first embodiment with reference to FIG. 4.

Firstly, the serial number issue unit 13 issues a serial number, such as "0001" (S11), and passes the serial number to the file name generation unit 14. On the other hand, the UMID generation unit 12 generates a basic UMID, such as "060A2B340101010501010D4313000000BEF8467C533 005CC0040 001004200024" (S12), and passes the basic UMID to the file name generation unit 14. Thereby, the file name generation unit 14 generates a file name which includes the serial number and the basic UMID (S13), and passes the file name to the writing unit 15. The writing unit 15 writes, as a file, the data which is generated by a imaging unit (not shown) into the storage medium 20, under the file name which is generated by the file name generation unit 14 (S14).

Figure 5:
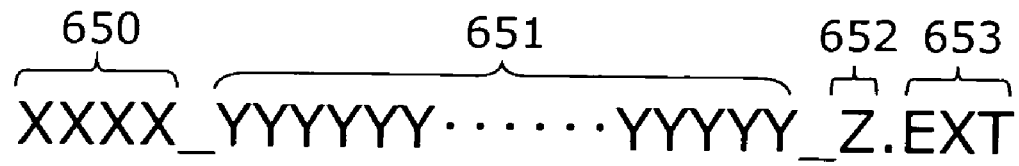
FIG. 5 is a diagram showing a format of a file name according to the first embodiment.

FIG. 5 is a diagram showing a format of the file name according to the first embodiment. A 4-character XXXX part 650 is used for a clip name (serial number). The serial number enables to ensure visibility and comprehensibility of a user, as described is further below. A YY . . . YY part 651 is used for the basic UMID which is expressed by ASCII (64-character ASCII). A Z part 652 of one character is used for a channel number if the file is audio data. An EXT part 653 of three or less characters is used for a file extension.

For example, a file name of a MXF audio file in the first channel which is the first data taken by the image capturing apparatus 10 is "001_060A2B34010101 0501010D4313000000BEF8467C533005CC00400010042 00024_0.mxf". The MXF file is defined by SMPTE377M.

Figure 6:
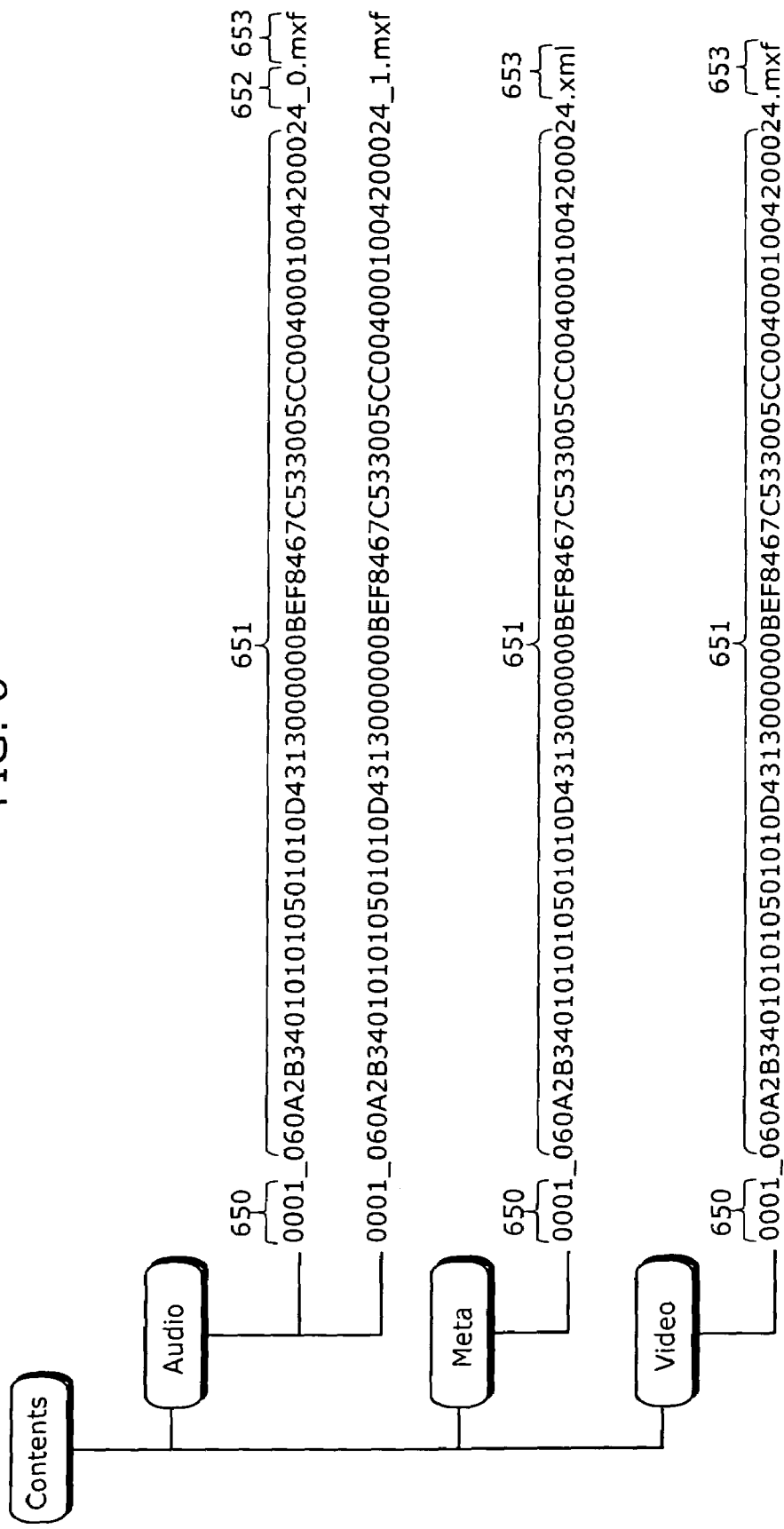
FIG. 6 is a diagram showing a directory structure in a storage medium.

FIG. 6 is a diagram showing a directory structure in the storage medium 20. Here, a "contents" directory has sub-directories of an "audio" directory, a "meta" directory, and a "video" directory. The audio directory manages audio data, the meta directory manages meta data, and the video directory manages video data. This means that the directories are not divided according to clips, but divided according to types of essence files.

Figure 7:
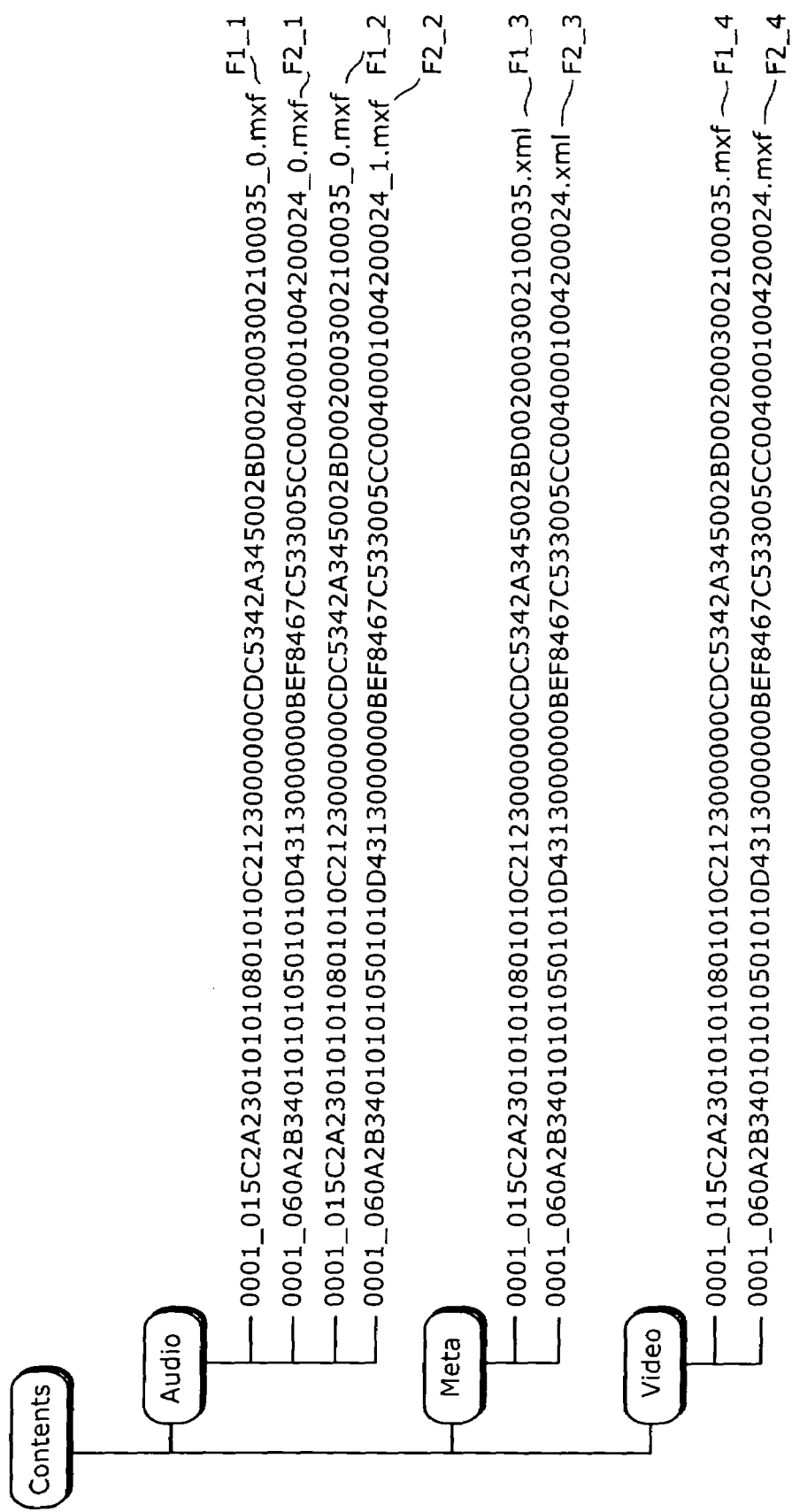
FIG. 7 is a diagram showing a directory structure in an editing apparatus.

FIG. 7 is a diagram showing a directory structure in the editing apparatus 30. Here, in the same manner as described for the directory structure of the storage medium 20, a "contents" directory has sub-directories of an "audio" directory, a "meta" directory, and a "video" directory. There are essence files FL1_1, F1_2 and F1_3, each of which has a same character string "0001_015C2A230101010801010C 2123000000CDC5342A345002B D0020003002100035", and essence files FL2_1, F2_2 and F2_3, each of which has a same character string "0001_060A2B 340101010501010D4313000000BEF8467C533005C C0040001004200024".

For the above-described clip, the clip name (serial number) is "0001", and the basic UMID is "060A2B 340101010501010D4313000000BEF8467C533005CC0040 001004200024". Thus, each essence file of this clip includes, in each file name, a character string of "0001_ 060A2B340101010501010D4313000000BEF8467C 533005C C0040001004200024".

The user can recognize that the files FL2_1, F2_2, and F2_3, each of which has the same character string, are essence files belonging to the same clip. Obviously, in a single image capturing apparatus 10, only clip name (serial number) "0001" is necessary to recognize those files as essence files belonging to the same clip.

As described above, according to the first embodiment, a file name which includes the basic UMID is generated, so that no plurality of identical file names exist in the files which are created by a plurality of image capturing apparatuses. This means that, even if clips, which are generated by a plurality of image capturing apparatuses, are copied into the same directory in the editing apparatus, no plurality of identical file names appear in the editing apparatus. This prevents a necessity of changing the file name, or a problem of overwriting and deleting the clip.

Note that the first embodiment has described that the file name includes the basic UMID, but the same effect as described above can be achieved by using any other globally unique identifier. Here, in order to generate the UMID, a serial number of the image capturing apparatus 10 is necessary, as described above. Even if another globally unique identifier except the UMID is applied, such an identifier is obtained by requesting a specific host computer to provide the identifier, so that it is difficult to apply such a method for all image capturing apparatuses.

Figures 8, 9:
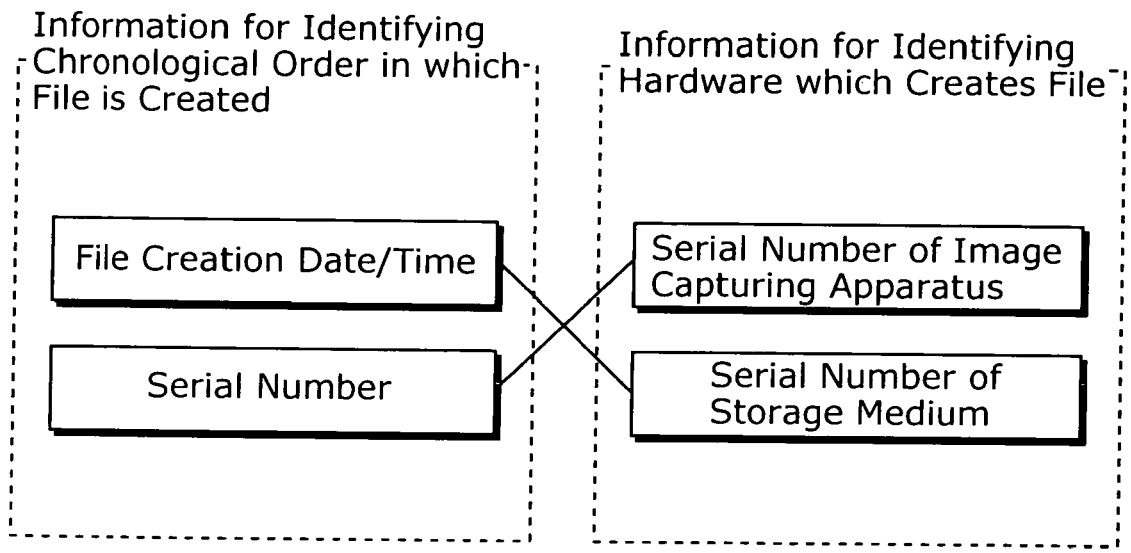
FIG. 8 is a diagram showing another format of a file name according to the first embodiment.
FIG. 9 is a diagram showing an internal structure of a globally unique identifier.

Therefore, in a case that it is necessary to easily obtain the globally unique identifier, a serial number of the storage medium 20 may be used. That is, if the serial number of the storage medium 20 is included in the file name, the same identical file name does not exist in another storage medium 20, so that uniqueness is required to be ensured only in each storage medium 20. In order to ensure the uniqueness in the storage medium 20, a serial number of the file creation may be used, for example. That is, as shown in FIG. 8, the XXXX part 650 is used for the serial number of the file creation, and the YY . . . YY part 671 is used for the serial number of the storage medium 20.

FIG. 9 is a diagram showing an internal structure of the globally unique identifier. As shown in FIG. 9, a character string can be considered to be the globally unique identifier, since the character string includes: data for identifying a chronological order in which a file has been created; and data for identifying a hardware which creates the file. Here, the data for identifying a chronological order, in which a file has been created, is a date and time of the file creation, or the above-described serial number, for example. On the other hand, the data for identifying a hardware, which creates the file, is a serial number of the image capturing apparatus 10, a serial number of the storage medium 20 equipped in the image capturing apparatus 10, or a volume label, for example.

Note that, the file name may include any other information, if the file name includes a globally unique identifier. For example, the file name may include an extended UMID, instead of the basic UMID.

Note that the first embodiment has described that the file name includes the serial number of the file creation in addition to the basic UMID, but the present invention is not limited to the above. This means that, the file name includes the serial number in order to ensure the visibility and the comprehensibility of the user, so that the serial number is not necessarily included in the file name in order only to solve the conventional problem of the existence of a plurality of identical file names.

Note also that, in the first embodiment, the image capturing apparatus 10 is assumed to automatically generate a file name thereby using the serial number as the clip name, but the present invention is not limited to the above. This means that, the file name includes the clip name in order to ensure the visibility and the comprehensibility of the user, so that the user may enter any arbitrary clip name every time the user takes video or a photograph.

Second Embodiment

Although the first embodiment has been described based on the assumption that the file system supports the long file name, some file systems do not support the long file name. For example, the FAT file system support a short file name in so-called 8.3 format which includes a main file name of eight or less characters and an extension of three or less characters.

Therefore, as described in the first embodiment, even if a file name "0001_060A2B340101010501010 D4313000000BEF 8467C533005C C0040001004200024_ 0.mxf" is generated, the file name is changed to a file name "0001_060 . . . mxf" to be managed in the FAT file system, which files to achieve the effect in the first embodiment of preventing the existence of a plurality of identical file names. The following describes differences between a structure of the image capturing apparatus 10 according to the second embodiment and that of the first embodiment.

Figure 10:
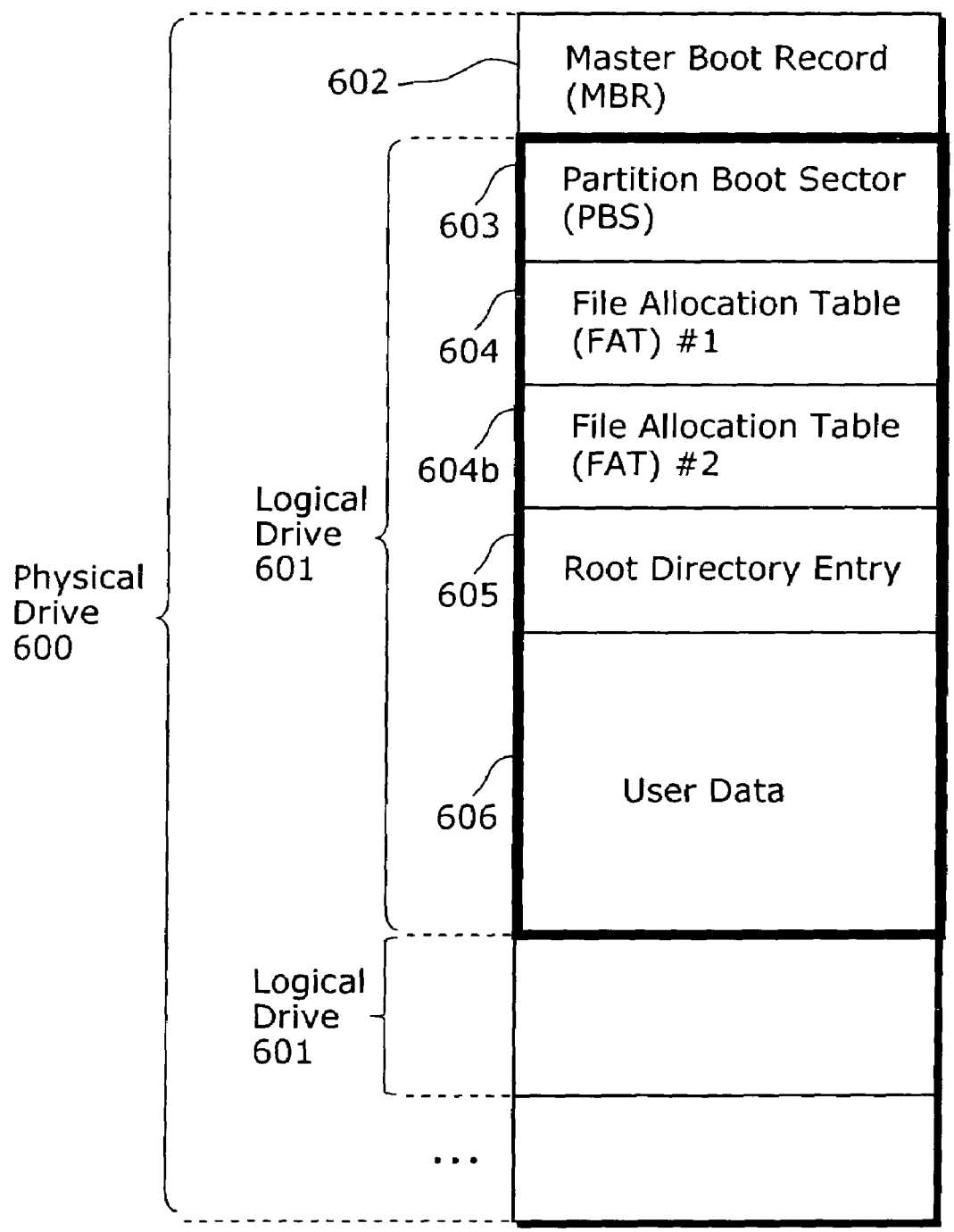
FIG. 10 is a diagram showing a FAT format.

FIG. 10 is a diagram showing a FAT format. A physical drive 600, such as a memory card or a hard disk, includes: a master boot record 602 which is generally in the first area of the physical drive 600; and one or more logical drives 601. Each logical drive 601 is formatted with one type of file system. If the logical drive 601 is formatted with the FAT format, there are arranged system areas, which are, from the first area in the drive, a partition boot sector 603, a file allocation table (FAT) 604, a backup 604*b* of the FAT, and a root directory entry 605, and after those system areas there is arranged a user data area 606. The partition boot sector 603 stores information which is necessary to start partitioning, such as is the number of sectors in a partition. The FAT 604 stores information of file storage. The user data area 606 stores file data itself. The file is stored in units of clusters (4 Kbytes to 32 Kbytes, normally).

Figure 11:
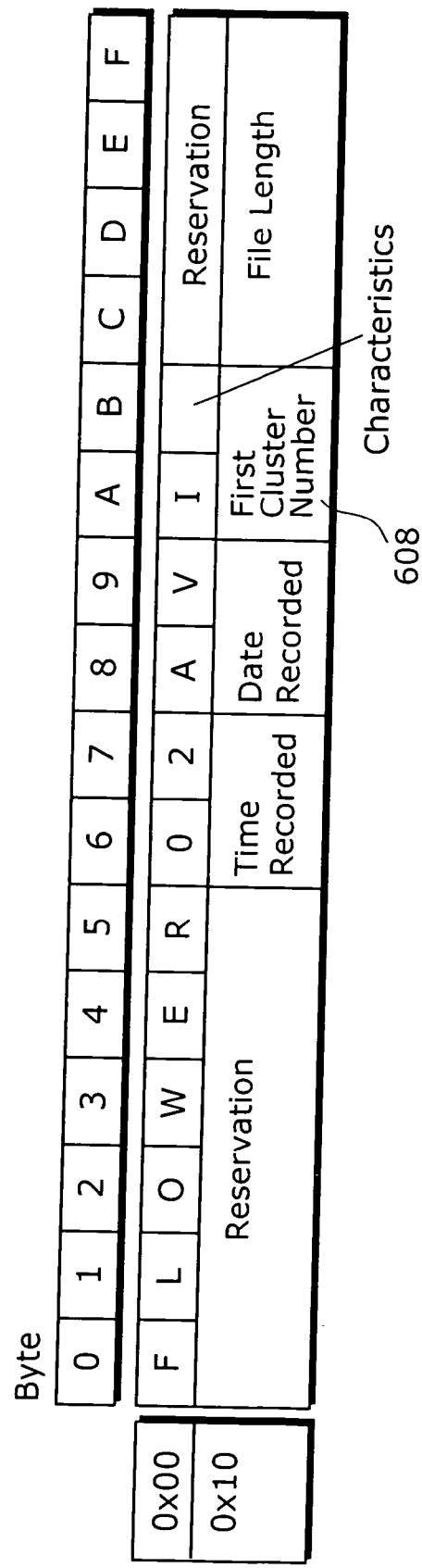
FIG. 11 shows a directory entry.

FIG. 11 shows a directory entry of a file whose file name is FLOWER02.AVI. The root directory entry 605 stores, as an entry, information of a file or a directory in a root directory. In a directory of a hierarchical structure, every file and directory is stored as a directory entry 607 of 32 bytes, as shown in FIG. 11. Thus, in the FAT format, a file is stored in 8.3 format in which a file name is stored as eight characters and an extension is stored as three characters. The directory entry 607 includes a first cluster number 608 of cluster numbers which correspond to the stored file data. The first cluster number 608 is used to access the file data.

Figure 12:
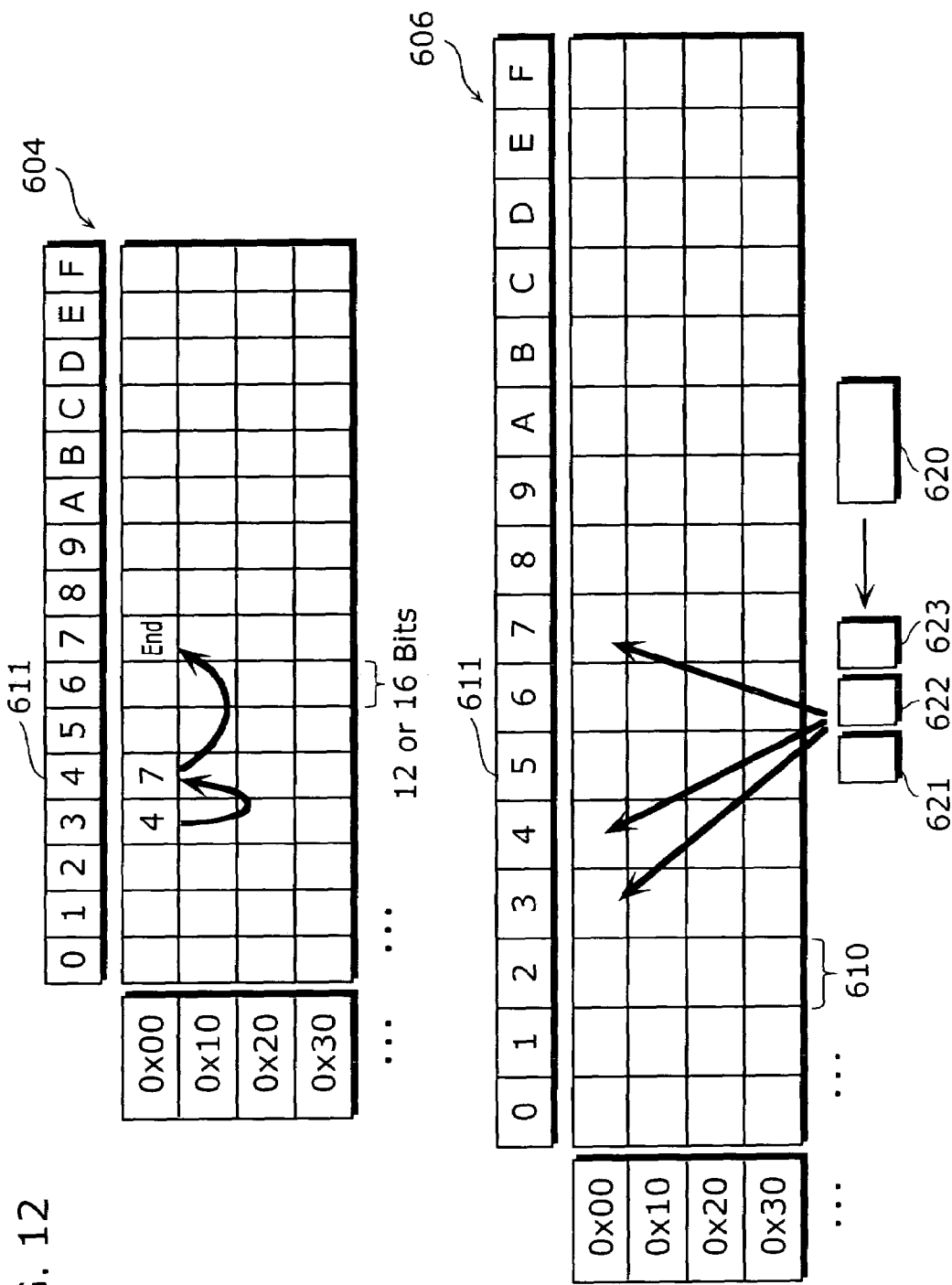
FIG. 12 is a diagram showing information of file storage which is arranged in a FAT.

FIG. 12 is a diagram showing the information of file storage which is arranged in the FAT 604. The FAT 604 is a table which manages clusters in the user data area 606. The FAT 604 stores cluster numbers of next data in a file, in units of 12 bits, 16 bits, or the like. For example, when a file 620 is divided into partial data 621, 622, and 623, and stored into clusters having cluster numbers 3, 4, and 7, respectively, in order to store the file 620 into the user data area 606, the FAT 604 stores "4" in a position of the cluster number 3, stores "7" in a position of the cluster number 4, and finally stores an "End" mark in a position of the cluster number 7, as information for connecting the clusters. The first cluster number 3 of the file 620 is stored in the directory entry 607 regarding the file 620, as described above.

Figure 13:
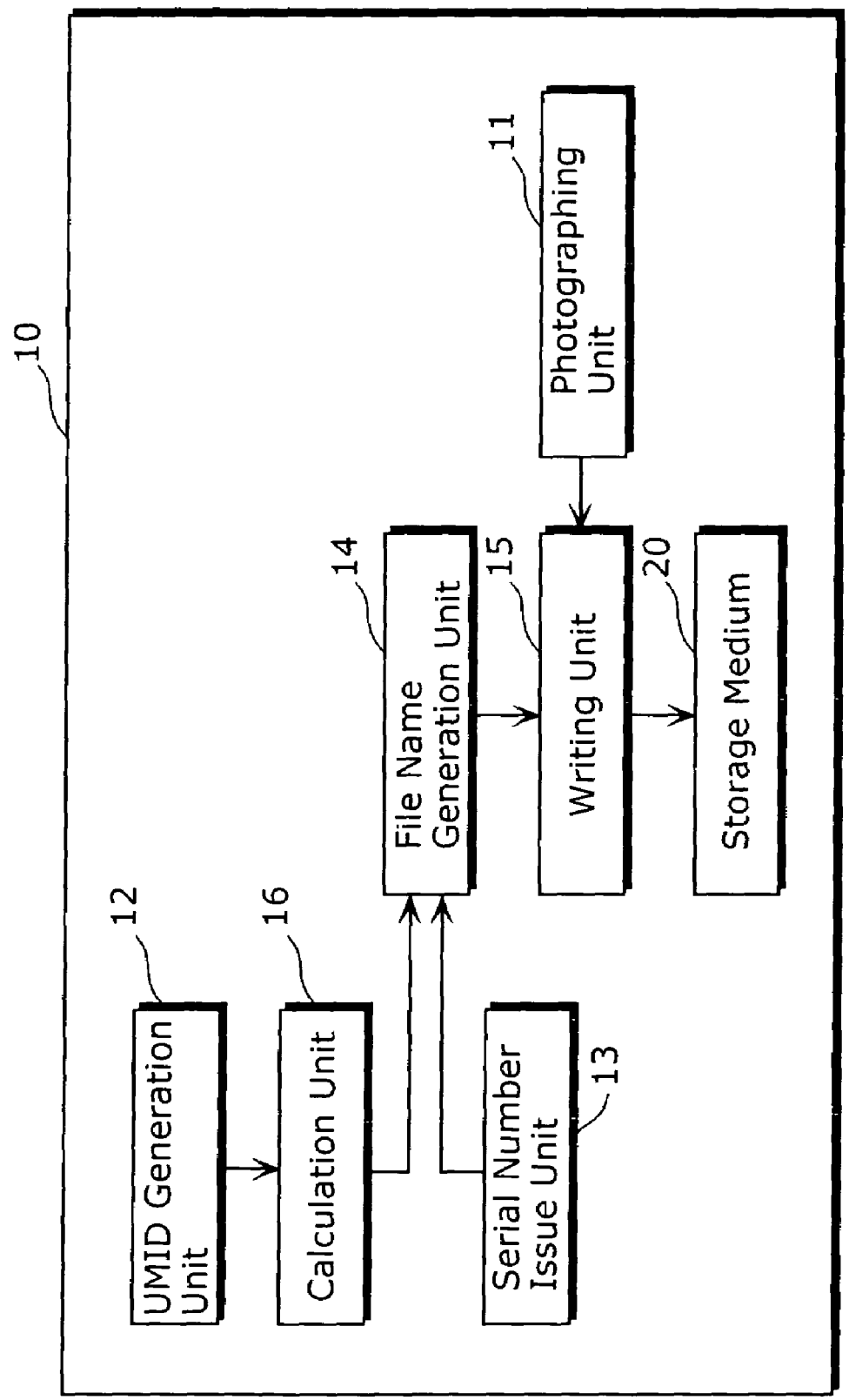
FIG. 13 is a schematic functional block diagram of an image capturing apparatus according to the second embodiment.

FIG. 13 is a schematic functional block diagram of an image capturing apparatus 10 according to the second embodiment. As shown in FIG. 13, an image capturing apparatus 10 according to the second embodiment has the same structure as the structure of the image capturing apparatus 10 of the first embodiment, but a calculation unit 16 is added in the image capturing apparatus 10 according to the second embodiment. The calculation unit 16 calculates a hash value by using the basic UMID which is generated by the UMID generation unit 12. A method for the calculation is described in more detail further below.

Figures 14, 15:
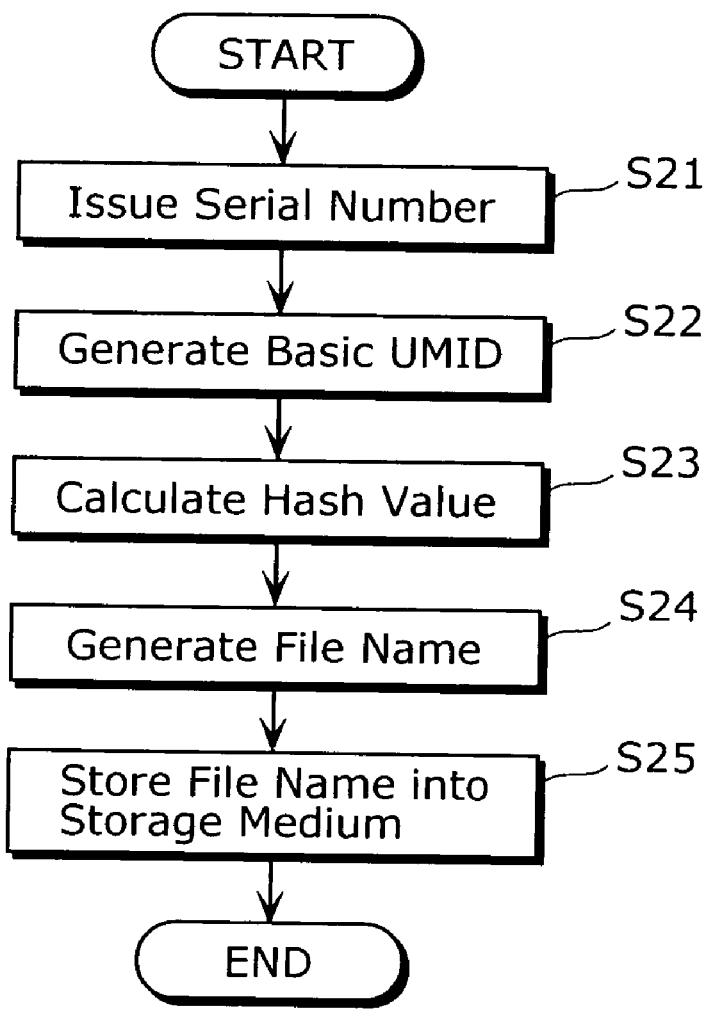
FIG. 14 is a flowchart showing processing performed by the image capturing apparatus according to the second embodiment.
FIG. 15 is a diagram showing a format of a file name according to the second embodiment.

FIG. 14 is a flowchart showing processing performed by the image capturing apparatus 10 according to the second embodiment. The following describes the processing performed by the image capturing apparatus 10 according to the second embodiment.

Firstly, the serial number issue unit 13 issues a serial number, such as "0001" (S21), and passes the serial number to the file name generation unit 14. On the other hand, the UMID generation unit 12 generates a basic UMID, such as "060A2B340101010501010D4313000000BEF8467C533 005CC0040 001004200024" (S22), and passes the basic UMID to the calculation unit 16. Thereby, the calculation unit 16 calculates a hash value by using the basic UMID generated by the UMID generation unit 12 (S23), and passes the hash value to the file name generation unit 14. Thereby, the file name generation unit 14 generates a file name which includes the serial number and the hash value (S24), and passes the file name to the writing unit 15. The writing unit 15 writes, as a file, data which is created by an imaging unit (not shown) into the storage medium 20, under the file name which is generated by the file name generation unit 14 (S25).

FIG. 15 is a diagram showing a format of a file name according to the second embodiment. A XXXX part 660 is used for the serial number of four characters. A YY part 661 is used for the hash value of two characters. A ZZ part 662 is used for a channel number of two characters. Note that information in the YY part 661 may be numerals, so that the ZZ part 662 is a zero-padding when the data is not audio data, in order to increase visibility of the user. An EXT part 653 is used for a file extension of three or less characters.

Figure 16:
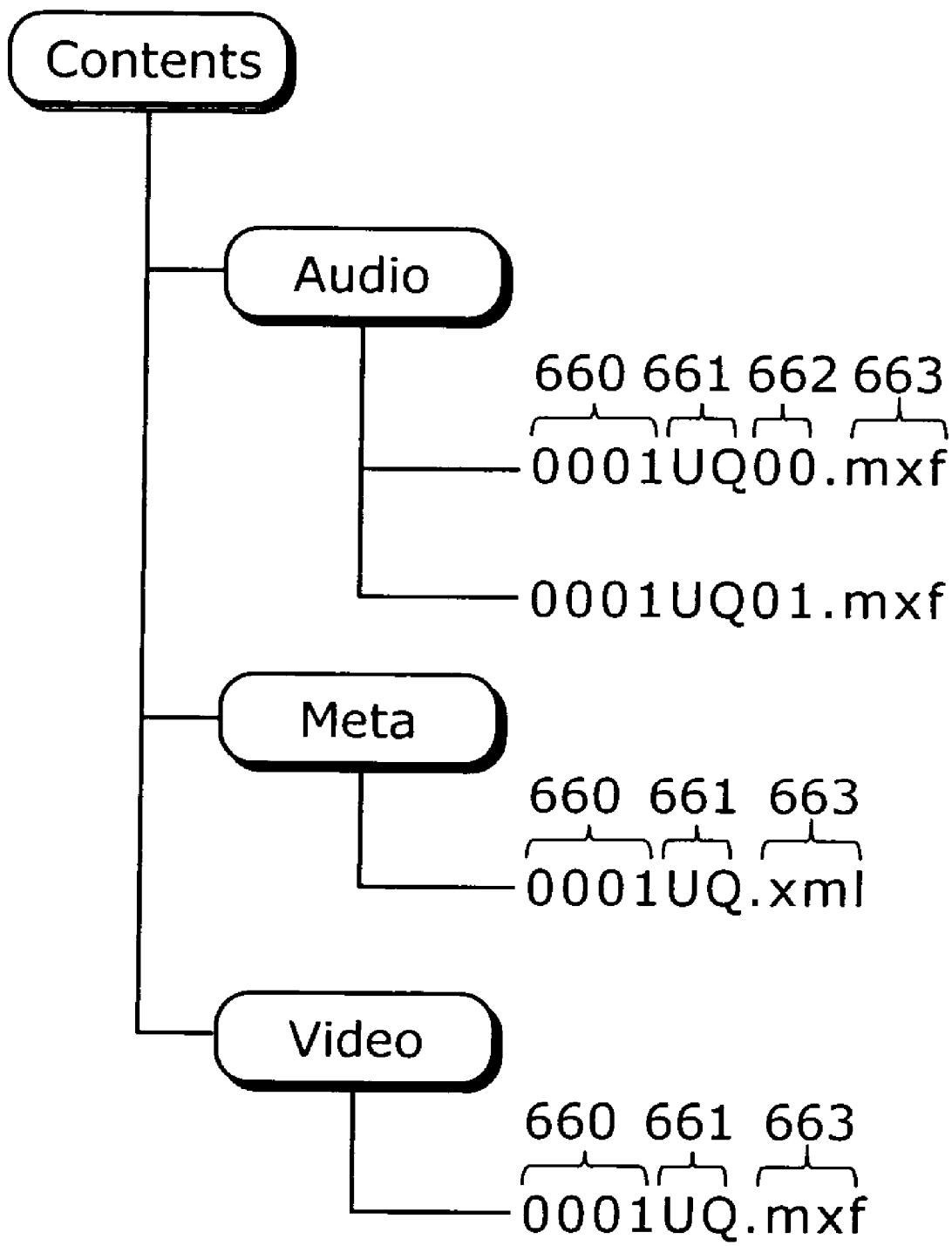
FIG. 16 is a diagram showing a directory structure of the storage medium.

FIG. 16 is a diagram showing a directory structure of the storage medium 20. For example, the file name of the MXF audio file in the first channel which is the first data taken by the image capturing apparatus 10 is "001_060A 2B340101010501010D4313000000BEF8467C533005CC 0040001004200024_0.mxf" as described in the first embodiment, but in the second embodiment the file name becomes "0001UQ01.mxf". Processing for generating a hash value "UQ" to be used in the YY part 661 is described below.

FIG. 17 is a diagram showing the processing for generating the hash value "UQ".

Firstly, a material number "BEF8467C 533005CC0040001004200024" is extracted from a basic UMID "060A2B340101010501010D4313000000BEF8467 C533005CC0040 001004200024" (S101). Next, the extracted material number is divided into eight blocks by two bytes, such as "BEF8", "467C", "5330", "05CC", "0040", "0010", "0420", and "0024" (S102). Then, ASCII characters of 2 bytes which are divided by the above processing is converted to numerals of 2 bytes by little endian, such as {0xF8BE, 0x7C46, 0x3053, 0xCC05, 0x4000, 0x1000, 0x2004, 0x2400} (S103). Next, an exclusive OR 0x2CAA is calculated for each bit of eight numerals of 2 bytes (S104). Next, the calculated exclusive OR 0x2CAA is divided by 1291 which is the smallest prime number of two digits in base 36 notation in order to leave a reminder 1106 (S105). Finally, the remainder 1106 is indicated by two digits in base 36 notation with a zero-padding in order to obtain the hash value UQ (S106).

As described above, according to the second embodiment, the file name includes the hash value which is calculated from a globally unique identifier, so that it is possible to reduce a possibility of the existence of a plurality of identical file names into 1/1291, even if the files names have identical local identifiers (serial numbers).

Note that, the second embodiment has described that the hash value has two characters, but, when the hash value has more than three characters (N characters), the material number may be divided by N bytes at S102. Note also that the second embodiment has described that the ASCII character is converted into numerals by little endian at S103, but the ASCII character may be converted into the numerals by big endian. Note also that, at S105, the base 36 notation is indicated by the numerals 0 to 9 and the alphabets A to Z, but the notation can be indicated by other notations by reducing the alpha-numeric characters or by adding the alpha-numeric characters with symbols which are usable in the file name.

Note also that, the second embodiment has described that the file name is generated as a short file name in so-called 8.3 format, but, the file name may be generated also as other file names, besides the 8.3 format, such as a long file name, by using the method by which the file name includes the hash value which is calculated from a globally unique identifier.

Note also that, the second embodiment has described that the file name is generated as a short file name in so-called 8.3 format by including, in the file name, the hash value which is calculated from a globally unique identifier, but the present invention is not limited to the above. That is, the user may previously set, in the image capturing apparatus 10, an identifier which varies depending on the image capturing apparatus 10, and the file name generation unit 14 may use the previously set identifier in the YY part 661.

Note also that, the second embodiment has described that the hash value is calculated from the material number, but the present invention is not limited to the above. That is, as far as the hash value is calculated to be a globally unique identifier, the present invention can achieve the same effect as described above.

Third Embodiment

The first and second embodiments have described the method for generating a file name which includes a globally unique identifier. The third embodiment describes a method for searching a file whose name includes a globally unique identifier, by using the editing apparatus 30.

Figure 18:
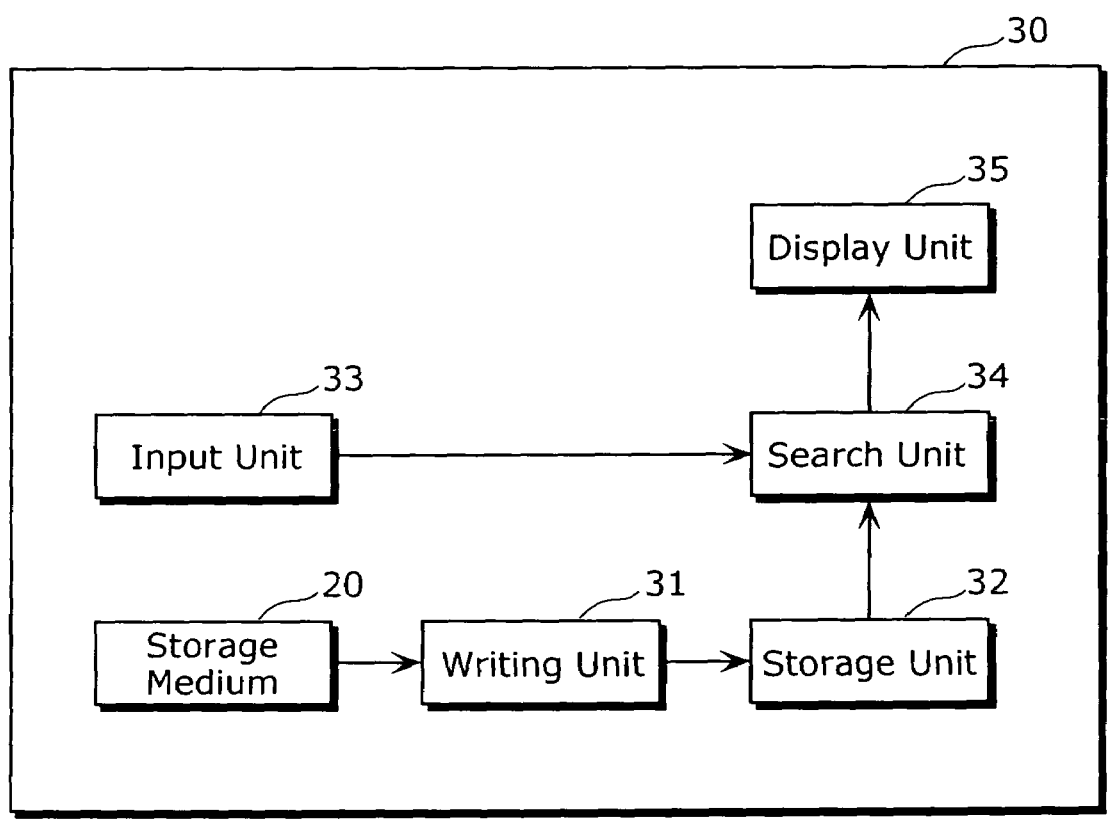
FIG. 18 is a schematic functional block diagram of the editing apparatus.

FIG. 18 is a schematic functional block diagram of the editing apparatus 30. The editing apparatus 30 includes, as functions, a writing unit 31, a storage unit 32, an input unit 33, a search unit 34, and a display unit 35. The writing unit 31 copies (writes) data in the storage medium 20 onto the storage unit 32. The storage unit 32 is a hard disk or the like which stores the data. The input unit 33 is a keyboard or the like which inputs information. The search unit 34 searches the storage unit 32 based on the information which is inputted by the input unit 33. The display unit 35 is a display or the like which displays the data that is searched by the search unit 34.

Figure 19:
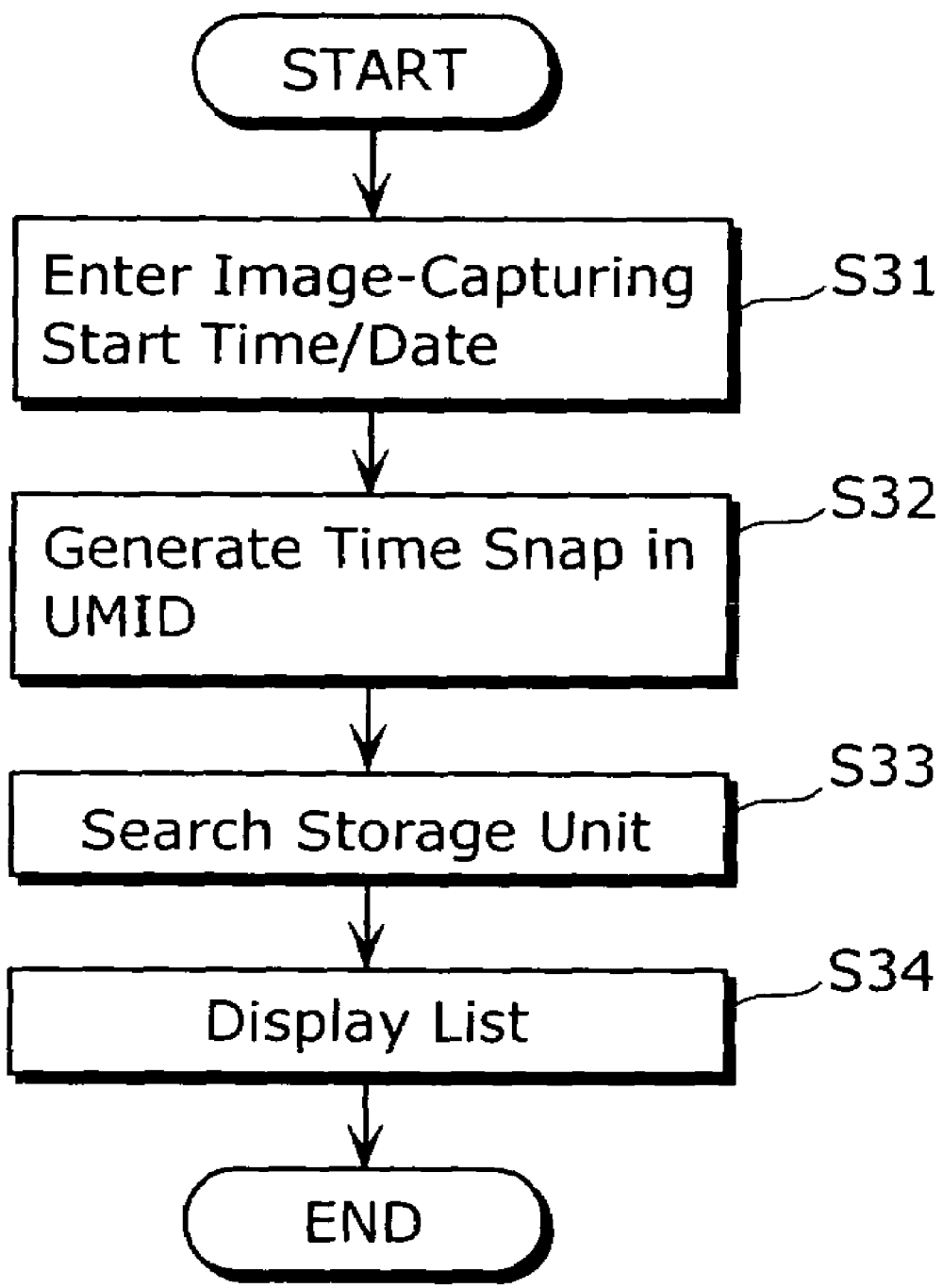
FIG. 19 is a flowchart showing search processing performed by the editing apparatus.
Figure 20:
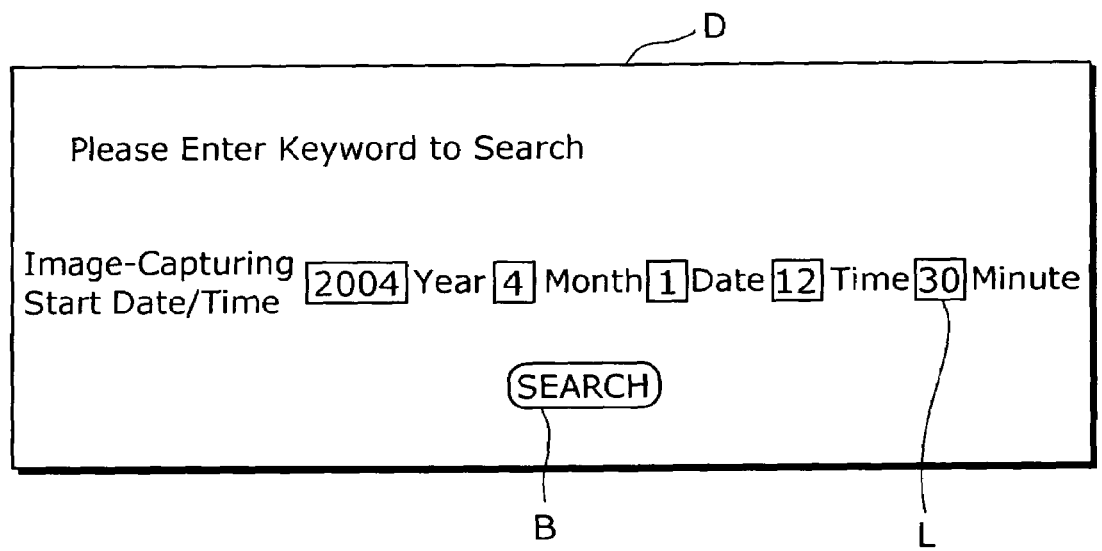
FIG. 20A is a diagram showing one example of a search keyword entry screen which is displayed by the editing apparatus.
FIG. 20B is a diagram showing one example of a search result screen which is displayed by the editing apparatus.

FIG. 19 is a flowchart showing search processing performed by the editing apparatus 30. FIG. 20A is a diagram showing one example of a search keyword entry screen which is displayed by the editing apparatus 30. FIG. 20B is a diagram showing one example of a search result screen which is displayed by the editing apparatus 30. The search processing performed by the editing apparatus 30 is described below with reference to FIGS. 19, 20A, and 20B.

Firstly, the display unit 35 displays a screen from which a search keyword is entered, as shown in FIG. 20A. Here, when the user inputs an image-capturing start time and date, such as "Apr. 1, 2004, 12:30" into an input field L by using the input unit 33, and clicks a search button B (S31), the search keyword "Apr. 1, 2004, 12:30" is accepted by the search unit 34.

Then, the search unit 34 generates a time snap in a UMID based on the search keyword "Apr. 1, 2004, 12:30" (S32). More specifically, a method for setting a time snap of a UMID is a method for setting a date and time frame (year, month, date, hour, minute, and second) as data of 8 bytes, so that a frame of "Apr. 1, 2004, 12:30:00" is represented by a data string {0x87, 0xOA, 0x25, 0x05, 0x96, 0x30, 0x05, 0x80}. Therefore, a file name whose image-capturing start time and date is "Apr. 1, 2004, 12:30" includes a character string "870A250596300580".

Then, the search unit 34 searches the storage unit 32 (S33), searches a file whose file name includes the character string "870A250596300580", and passes the searched file to the display unit 35. As a result, as shown in FIG. 20B, the display unit 35 displays a list of files whose image-capturing start times and dates are "Apr. 1, 2004, 12:30" (S34).

As described above, according to the third embodiment, even if a file is created with a file name which includes a globally unique identifier, it is possible to easily search the file by using an editing apparatus and the like.

Note that the third embodiment has described that the search keyword is the image-capturing start time and date, but the search keyword is not limited to the above. For example, the keyword may be an image-capturing location, such as "Tokyo" or "Osaka". However, the information of the image-capturing location is not included in the basic UMID, so that the above case needs to include the extended UMID in the file name. Alternatively, a correspondence table as described below can be previously created in order to search the file based on the image-capturing location, even if the basic UMID is included in the file name.

Figure 21:
FIG. 21 is a diagram showing one example of a correspondence table in which UMIDs corresponds to image-capturing locations.

FIG. 21 is a diagram showing one example of the correspondence table in which the UMID corresponds to the image-capturing location. Here, to simplify the description, the UMID is not described in detail, but indicated merely as UMID-1 to UMID-4. The UMID-1 corresponding to Tokyo means that a is material stored in a file UMID-1 has been created in Tokyo. The UMID-2 corresponding to Osaka and the UMID-3 corresponding to Tokyo mean in the same manner as described for the UMID-1. A timing of creating the correspondence table is not specifically limited, as far as the correspondence table is created prior to removal of the storage medium 20 from the image capturing apparatus 10, in other words, prior to copying the file from the storage medium 20 to the editing apparatus 30.

For example when the file includes a source pack, the writing unit 31 opens the file and obtains the location information from the source pack, prior to removal of the storage medium 20 from the image capturing apparatus 10. Then, a correspondence table T as described above is created based on the location information and stored in the storage medium 20. Next, the editing apparatus 30 reads the correspondence table T from the storage medium 20, and copies the correspondence table T onto the storage unit 32. Thereby, even if "Tokyo" is inputted as a search keyword, for example, it is possible to extract the UMID-1, the UMID-3, and the like which correspond to "Tokyo" by searching the correspondence table T based on the search keyword "Tokyo".

Note that the above description has not mentioned, but a conventional search method needs to open a file in order to refer to details of the file. For example, when an image-capturing start time and date is input as the search keyword, conventionally it is impossible to learn the image-capturing start time and date from a file name, so that it is necessary to open the file and refer to a source pack in the file. On the other hand, according to the third embodiment, it is possible to learn the image-capturing start time and date only from a file name, so that it is not necessary to open the file. This means that it is possible to shorten a time required for the search processing.

Note that the second embodiment has described that the file name includes the hash value which is calculated from a globally unique identifier, and the above-described search processing can be performed even in such a case. For example, when the user inputs a image-capturing start time and date, such as "Apr. 1, 2004, 12:30" into an input field L by using the input unit 33, and clicks the search button B, the search unit 34 obtains a character string "870A250596300580" based on the search keyword "Apr. 1, 2004, 12:30", in the same manner as described above. Then, a hash value is calculated from the character string "870A250596300580" and files whose file names include the hash value are searched. The hash value may be calculated by the search unit 34, or by the calculation unit 16 instead of the search unit 34 as described in the second embodiment.

Note that the third embodiment has described that the file is searched based on the globally unique identifier, but the file may be searched based on the serial number (local identifier).

Note also that the third embodiment has described the method for generating the file name of video data and audio data, but the present invention is not limited to the above. That is, the present invention can be applied in a method for generating file names of other materials.

The file name generation apparatus according to the present invention can be applied to a video camera, a digital still camera, and the like, in which a plurality of identical name files should not exist.

The invention claimed is:

1. A file name generation apparatus that generates a file name, said file name generation apparatus comprising:
    an identifier generation unit operable to generate an identifier that includes (i) information identifying a chronological order in which a file is created and (ii) information identifying a hardware that creates the file;
    a calculation unit operable to calculate a hash value of the generated identifier, the hash value being represented by N characters, which are alpha-numeric characters that are usable for a file name of the file;
    a number issue unit operable to issue a number when the file is created; and
    a file name generation unit operable to generate the file name, the file name including (i) the hash value represented by the N alpha-numeric characters and (ii) the number issued by said number issue unit,
    wherein said calculation unit calculates the hash value by (i) dividing the identifier into a plurality of blocks, each block having N bytes, (ii) calculating an arithmetic operation value having N bytes by performing a predetermined arithmetic operation on the plurality of blocks, and (iii) setting the hash value represented by the N alpha-numeric characters to a remainder calculated by dividing the arithmetic operation value by a predetermined value.

2. The file name generation apparatus according to claim 1, wherein said identifier generation unit is operable to generate the identifiers to further include (i) one of a date and a time when the file is created, and a serial number representing the chronological order in which the file is created, and (ii) a serial number of a storage medium in which the file is stored.

3. The file name generation apparatus according to claim 1, wherein said identifier generation unit is operable to generate the identifier to further include (i) a random number generated when the file is created, and (ii) one of a serial number of said file name generation apparatus, and a serial number of a storage medium in which the file is stored.

4. The file name generation apparatus according to claim 1, wherein the hash value is calculated such that the hash value is represented by an alpha-numeric character in base-L notation, where L is larger than 10.

5. The file name generation apparatus according to claim 1, wherein the hash value is calculated such that the hash value is represented by two alpha-numeric characters, wherein the number issued by said number issue unit is represented by four alpha-numeric characters, and wherein the generated file name includes (i) the hash value represented by the two alpha-numeric characters and (ii) the number issued by said number issue unit represented by the four alpha-numeric characters.

6. The file name generation apparatus according to claim 1, wherein the hash value is calculated such that the hash value is represented by two alpha-numeric characters, wherein the number issued by said number issue unit is represented by four alpha-numeric characters, and wherein the generated file name includes (i) the hash value represented by the two alpha-numeric characters, (ii) the number issued by said number issue unit represented by the four alpha-numeric characters, and (iii) a channel number that is represented by two alpha-numeric characters.

7. The file name generation apparatus according to claim 1 further comprising a storage unit operable to store multimedia data into a storage medium using the file name generated by said file name generation unit.

8. The file name generation apparatus according to claim 1, wherein said identifier generation unit is operable to generate, as the identifier, a Unique Material Identifier defined in SMPTE330M standard.

9. A method for generating a file name, said method comprising:

generating an identifier that includes (i) information identifying a chronological order in which a file is created and (ii) information identifying a hardware that creates the file;

calculating a hash value of the generated identifier, the hash value being represented by N characters, which are alpha-numeric characters that are usable for a file name of the file;

issuing a number when the file is created; and generating the file name, the file name including (i) the calculated hash value represented by the N alpha-numeric characters and (ii) the issued number, wherein said calculation of the hash value includes (i) dividing the identifier into a plurality of blocks, each block having N bytes, (ii) calculating an arithmetic operation value having N bytes by performing a predetermined arithmetic operation on the plurality of blocks, and (iii) setting the hash value represented by the N alpha-numeric characters to a remainder calculated by dividing the arithmetic operation value by a predetermined value.

10. A computer-readable recording medium having a program recorded thereon, said program for generating a file name, and said program causing a computer to execute a method comprising:

generating an identifier that includes (i) information identifying a chronological order in which a file is created and (ii) information identifying a hardware that creates the file;

calculating a hash value of the generated identifier, the hash value being represented by N characters, which are alpha-numeric characters that are usable for a file name of the file;

issuing a number when the file is created; and generating the file name, the file name including (i) the calculated hash value represented by the N alpha-numeric characters and (ii) the issued number, wherein said calculation of the hash value includes (i) dividing the identifier into a plurality of blocks, each block having N bytes, (ii) calculating an arithmetic operation value having N bytes by performing a predetermined arithmetic operation on the plurality of blocks, and (iii) setting the hash value represented by the N alpha-numeric characters to a remainder calculated by dividing the arithmetic operation value by a predetermined value.

* * * * *

UNITED STATES PATENT AND TRADEMARK OFFICE
CERTIFICATE OF CORRECTION

PATENT NO. : 7,539,698 B2
APPLICATION NO. : 10/586497
DATED : May 26, 2009
INVENTOR(S) : Katsuyuki Sakaniwa et al.

It is certified that error appears in the above-identified patent and that said Letters Patent is hereby corrected as shown below:

On the Title Page:

Item (56) References Cited, under the "OTHER PUBLICATIONS" heading, please insert the following reference:

--Hisakazu Tajimi, "Programming Technique Hash," UNIX MAGAZINE, May 1, 1998, Vol. 13, No. 5, pages 99-106--

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,539,698 B2 | Page 1 of 1 |
| APPLICATION NO. | : 10/586497 | |
| DATED | : May 26, 2009 | |
| INVENTOR(S) | : Katsuyuki Sakaniwa et al. | |

It is certified that error appears in the above-identified patent and that said Letters Patent is hereby corrected as shown below:

On the Title Page, after Item [87], please insert the following:

Item -- [30] Foreign Application Priority Data

Mar. 31, 2004   [JP]   Japan ..................... 2004-103761 --

Signed and Sealed this

Eighteenth Day of May, 2010

David J. Kappos
*Director of the United States Patent and Trademark Office*